United States Patent
Sobel

(10) Patent No.: US 9,210,176 B2
(45) Date of Patent: Dec. 8, 2015

(54) MOBILE DEVICE CONNECTION CONTROL FOR SYNCHRONIZATION AND REMOTE DATA ACCESS

(71) Applicant: Symantec Corporation, Mountain View, CA (US)

(72) Inventor: William E Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/955,420

(22) Filed: Jul. 31, 2013

(65) Prior Publication Data

US 2015/0040179 A1 Feb. 5, 2015

(51) Int. Cl.
*G06F 17/00* (2006.01)
*H04L 29/06* (2006.01)

(52) U.S. Cl.
CPC .......... *H04L 63/104* (2013.01); *H04L 63/0876* (2013.01)

(58) Field of Classification Search
CPC ...................................................... H04L 12/12
USPC ............................................................ 726/1
See application file for complete search history.

(56) References Cited

U.S. PATENT DOCUMENTS

| 2005/0055380 | A1* | 3/2005 | Thompson et al. ............ 707/200 |
| 2007/0118560 | A1* | 5/2007 | Bornhoevd et al. ........ 707/104.1 |
| 2007/0266422 | A1 | 11/2007 | Germano et al. |
| 2009/0138975 | A1 | 5/2009 | Richardson |
| 2011/0209193 | A1 | 8/2011 | Kennedy |
| 2011/0252071 | A1* | 10/2011 | Cidon .......................... 707/802 |
| 2012/0240183 | A1 | 9/2012 | Sinha |
| 2013/0297662 | A1* | 11/2013 | Sharma et al. ................ 707/827 |

OTHER PUBLICATIONS

PCT International Search Report and Written Opinion for Counterpart Application PCT/US2014/49234 dated Nov. 13, 2014, 17 pages.

* cited by examiner

*Primary Examiner* — Thanhnga B Truong
*Assistant Examiner* — Khalil Naghdali
(74) *Attorney, Agent, or Firm* — Brill Law Office; Jefrey Brill

(57) ABSTRACT

Attempts by computing devices to access centralized data are managed according to device classification level rules. A request to access centralized data is received from an unclassified computing device. The unclassified computing device is classified into a specific one of the defined classes, based at least partially on information concerning the computing device read from the received request. Where a definition of the unclassified computing device has already been assigned to a specific class, the unclassified computing device is classified accordingly. Otherwise, the unclassified computing device is compared to multiple classified computing devices, and the unclassified computing device is classified according to the one that is most similar. Responsive to the classification of the computing device, the received request to access centralized data is governed according to a device classification level rule which specifies access policy for computing devices of the defined class.

18 Claims, 4 Drawing Sheets

MOBILE DEVICE CONNECTION CONTROL FOR SYNCHRONIZATION AND REMOTE DATA ACCESS

TECHNICAL FIELD

This disclosure pertains generally to synchronization and remote access of computer data, and more specifically to automatically controlling connections made by mobile computing devices based on device classification.

BACKGROUND

It is desirable for users to synchronize their mobile computing devices (e.g., phones, tablets, laptops) with their desktop computers and enterprise servers (e.g., a work email server administrated by a corporation, university or other organization). For example, users want to have the same, most recent email, contact and calendar data available at both their desktops and on their mobile devices.

Different solutions exist to provide such data synchronization, and they have evolved over time as the nature and usage of mobile devices have changed. Microsoft ActiveSync was a mobile data synchronization app that allowed a mobile device to be synchronized with a desktop computer, including an administrated server running a compatible platform such as Microsoft Exchange Server. ActiveSync synchronized Microsoft Outlook emails, calendar entries, contacts and tasks, along with Internet bookmarks and files. ActiveSync does not support many current mobile platforms, and is no longer included in Windows.

Exchange ActiveSync ("EAS"), not to be confused with the old ActiveSync app, is a protocol for the synchronization of email, contacts, calendar, tasks and notes from a server to a smartphone or other mobile computing device. The protocol is based on XML, and an Exchange ActiveSync server and mobile device communicate over HTTP (or HTTPS). Microsoft Exchange Server supports the use of Exchange ActiveSync to synchronize email, calendar data and contacts with mobile computing devices. Note that Microsoft Exchange Server, not to be confused with Exchange ActiveSync itself, is a Microsoft server program that provides group level mail services, calendaring software and a contact manager. In addition, Microsoft licenses Exchange ActiveSync to other parties, and support for Exchange ActiveSync is implemented in a number of competing collaboration platforms, such as Google Apps for Business, Lotus Domino and Novell GroupWise. Currently, Exchange ActiveSync is the de facto standard for synchronization between groupware and mobile devices, although other standards also exist, such as Open Mobile Alliance Data Synchronization and Device Management (formerly known as SyncML) and OpenSync.

Exchange ActiveSync provides some support for mobile device management and policy controls. For example, a server level administrator can block a specific mobile client, require mobile clients to have passwords meeting certain characteristics (e.g., minimum length, maximum duration), require manual synchronization when roaming, etc. Additionally, Microsoft Exchange and certain third party tools enable an administrator to allow or block an ActiveSync mobile client based on criteria including the presence or absence of the mobile client on a white/black list, the mobile client type (e.g., block all tablets) and the client operating system (e.g., block all devices running iOS). However, such policy control requires a significant amount of configuration and ongoing maintenance by the administrator, to account for and manage the significant number of devices connecting to a large enterprise's network environment. The administrator is responsible for approving the devices which can connect (if not all are allowed), and managing each user's allowed devices.

One third party product called ActiveSync Protector has a mode that allows an end user to self-register a single mobile device. In this mode, the first time a user attempts to connect to Exchange ActiveSync, his/her mobile device can be automatically registered. Registered devices are then automatically allowed access, unless or until the registration is cancelled or revoked. If the same user subsequently attempts to connect to Exchange ActiveSync with a different mobile device, the additional device is not automatically registered. This prevents an attacker who has obtained the user's credentials but not the user's mobile device from using a different device to connect into the enterprise's infrastructure. However, as a result the legitimate user is by default blocked from access with any additional mobile devices. Instead, the user is required to request that an administrator create an exception and explicitly allow each specific additional mobile device before the user can connect to ActiveSync with it, and thus access and synchronize with the data on the backend.

This model that allows a single mobile device per user was sufficient when each user typically carried only one mobile device (i.e., a phone). However, users are now likely to use multiple mobile devices (e.g., a smartphone and a tablet). Furthermore, newer versions of Microsoft Outlook also allow the synchronization of a Windows computer as an Exchange ActiveSync client (typically, this feature would be used in the case of a laptop). In the current environment in which a single user may well have three separate mobile devices, administrators are overwhelmed with exception requests, which are very labor intensive to review and process.

It would be desirable to address these issues.

SUMMARY

Attempts by computing devices to access centralized enterprise level data are managed according to one or more device classification level rules. In some embodiments, all of the computing devices in question are mobile computing devices. Multiple computing device classes are defined, for example smartphone, tablet, laptop computer and desktop computer. Default class definitions can be supplied automatically, and/or class definitions can be received from an enterprise level administrator, such as an administrator of an enterprise network. Definitions of multiple computing devices are assigned to specific classes, based on attributes concerning the computing devices such as name, model number, type, ID, operating system name and operating system version. A request to access centralized enterprise level data is received from an unclassified computing device, for example a request from an unclassified mobile computing device to synchronize data on an enterprise network with data on the mobile computing device. Such a request can but need not be in the form of a request to access the enterprise network and synchronize data via Exchange ActiveSync. The received request contains information concerning the unclassified computing device which is read from the request. For example, in an Exchange ActiveSync based embodiment the received request contains an inventory of the unclassified computing device. In other embodiments, the request contains information in other formats, for example attributes concerning the unclassified computing device such as the attributes named above (e.g., name, model number, type, ID, operating system name and operating system version).

The unclassified computing device is classified into a specific one of the defined classes, based at least partially on information concerning the computing device read from the received request. Where a definition of the unclassified computing device has already been assigned to a specific class, the unclassified computing device can be classified into that specific class without further analysis. Where this is not the case, information concerning the computing device read from the received request can be compared to corresponding information concerning multiple computing devices for which definitions have been assigned to specific defined classes. This compared information can be in the form of attributes concerning computing devices such as those named above, and different weights can be assigned to different attributes. A specific one of the multiple computing devices is adjudicated as being most similar to the unclassified computing device, based on the comparing of information. The unclassified computing device is then classified into the specific class to which the definition of the computing device adjudicated as being most similar has been assigned. The classification of the computing device is saved, and can be used to automatically classify subsequent instances of unknown computing devices having the same definition, without the need to repeat the comparing process.

Responsive to the classification of the computing device into the specific defined class, the received request to access centralized enterprise level data is governed according to one or more device classification level rules which specify access policy for computing devices of the specific defined class. Such device classification level rules can be supplied by default, and/or received from an enterprise level administrator. Individual users can each be allowed to automatically access enterprise level data using only up to a specific number of computing devices of each of multiple specific classes, based on a classification level rule that limits the number of computing devices of each different class with which individual users are permitted to access centralized data without requiring any additional action by an enterprise level administrator. One example of such a rule would be permitting each user to access centralized data with one computing device of each defined class (e.g., one smartphone, one tablet and one laptop). This scenario can further take the form of allowing individual users to each self-register only up to the specific maximum number of computing devices of each specific class, based on a corresponding device classification level rule. Individual users are then allowed to automatically access enterprise level data with computing devices registered to them, without requiring any additional action by an enterprise level administrator. In some embodiments, received requests made by different users to access centralized enterprise level data are governed according to different device classification level rules specifying different access policies for users of different classes.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
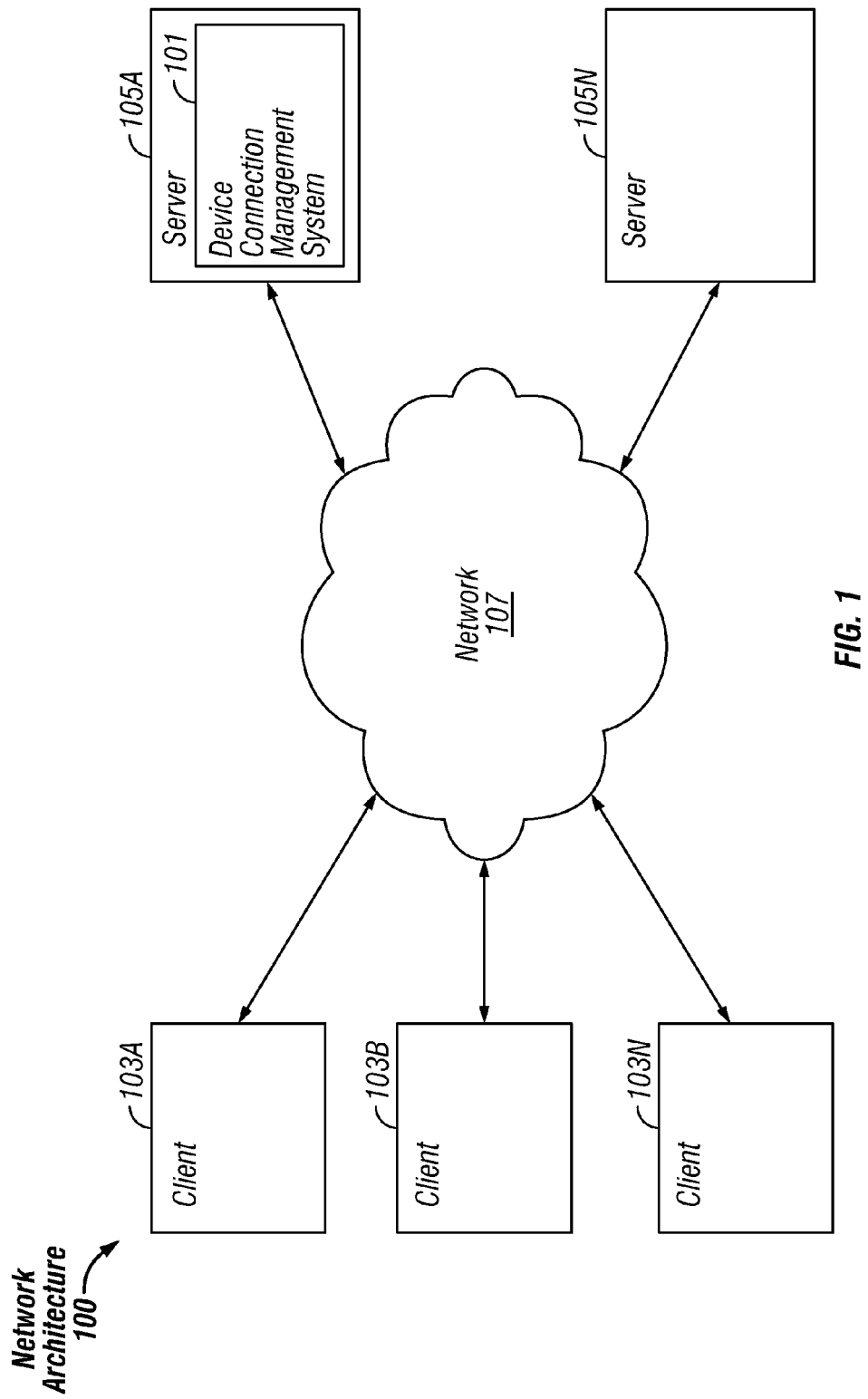
FIG. 1 is a block diagram of an exemplary network architecture in which a device connection management system can be implemented, according to some embodiments.

FIG. 1 is a block diagram illustrating an exemplary network architecture 100 in which a device connection management system 101 can be implemented. The illustrated network architecture 100 comprises multiple clients 103A, 103B and 103N, as well as multiple servers 105A and 105N. In FIG. 1, a device connection management system 101 is illustrated as residing on server 105A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or mobile computing devices 307, comprising portable computer systems capable of connecting to a network 107 and running applications. Such mobile computing devices 307 are sometimes referred to as smartphones, although many mobile phones not so designated also have these capabilities. Tablet computers are another example of mobile computing devices 307.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
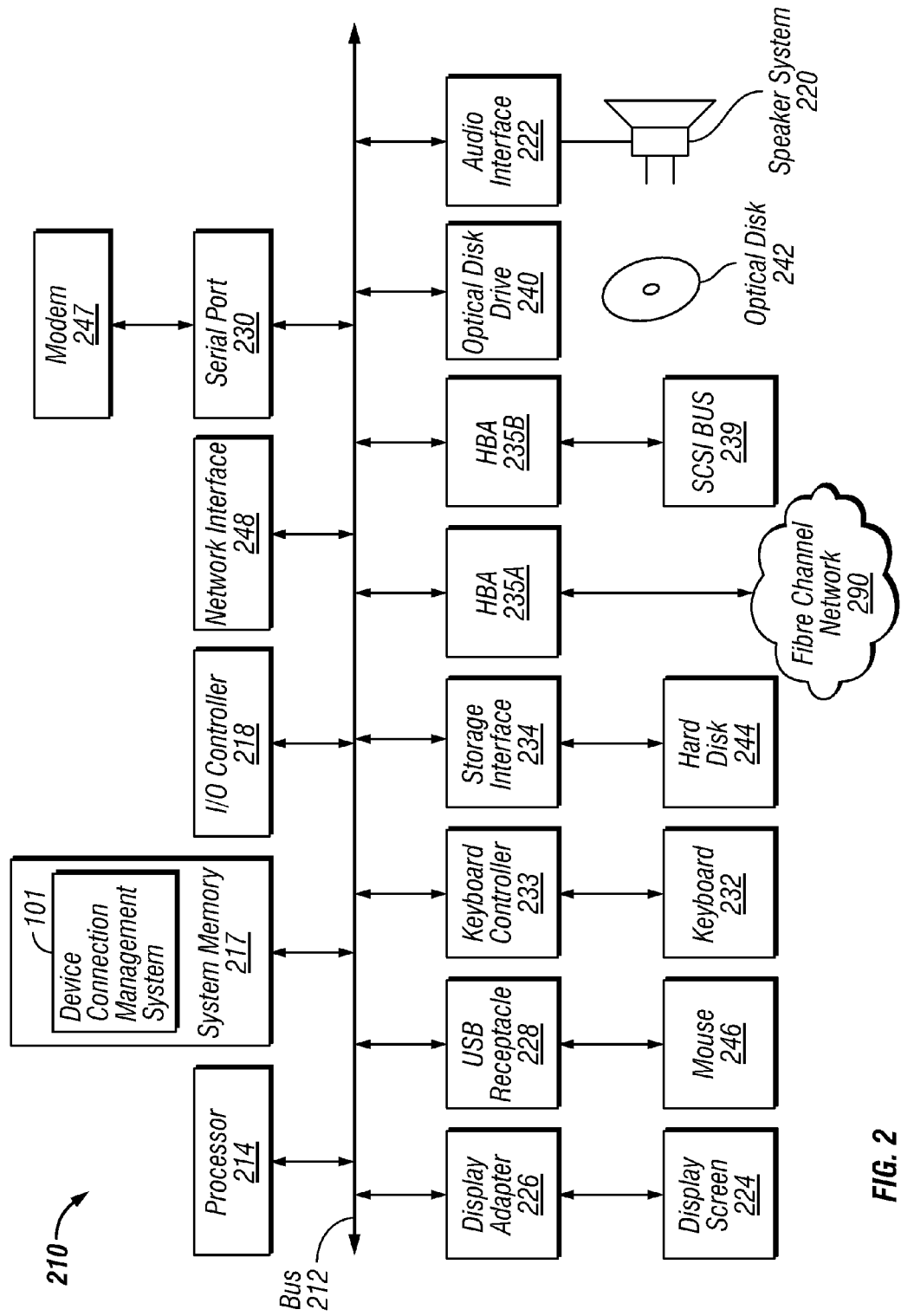
FIG. 2 is a block diagram of a computer system suitable for implementing a device connection management system, according to some embodiments.

FIG. 2 is a block diagram of a computer system 210 suitable for implementing a device connection management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 307 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the device connection management system 101 is illustrated as residing in system memory 217. The workings of the device connection management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
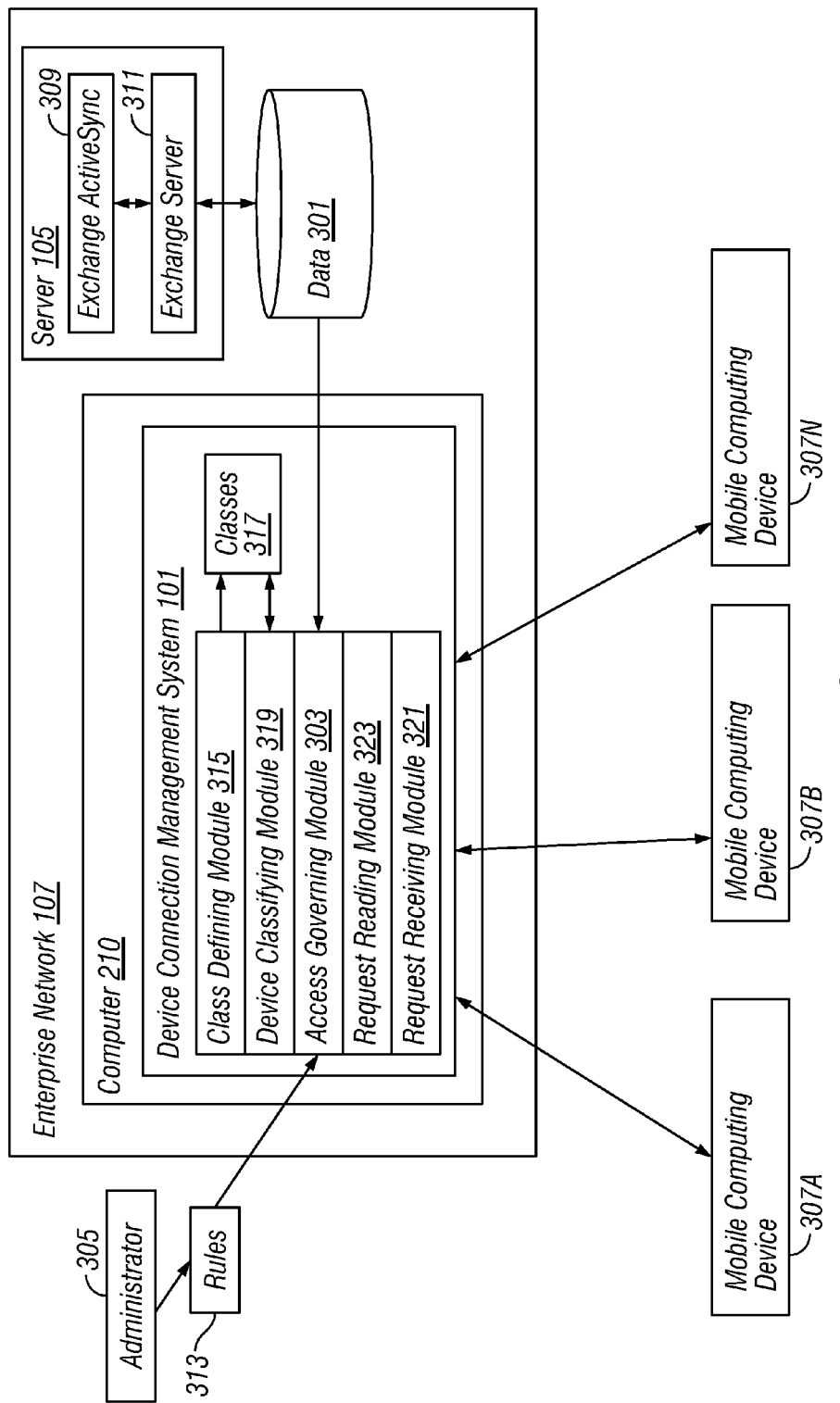
FIG. 3 is a block diagram of the operation of a device connection management system, according to some embodiments.

FIG. 3 illustrates the operation of a device connection management system 101, according to some embodiments. As described above, the functionalities of the device connection management system 101 can reside on a client 103, a server 105, or be distributed between multiple computer systems 210, including within a cloud-based computing environment in which the functionality of the device connection management system 101 is provided as a service over a network 107. It is to be understood that although the device connection management system 101 is illustrated in FIG. 3 as a single entity, the illustrated device connection management system 101 represents a collection of functionalities, which can be instantiated as a single or multiple modules as desired (an instantiation of specific, multiple modules of the device connection management system 101 is illustrated in FIG. 3). It is to be understood that the modules of the device connection management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the device connection management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a device connection management system 101 runs on a computer 210 (e.g., a server 105) and manages attempts by different types of remotely located computing devices 210 to access centralized data 301 within an enterprise network 107. As the term is used herein, an enterprise network 107 means a network 107 maintained by any type of organization (e.g., a corporation, a university, a government department, a municipality, a civic organization), wherein proprietary or other private data 301 is stored thereon, and access to the network 107 is restricted according to policies set by an administrator 305. For example, typically only authorized users (e.g., employees, students, members, etc.) are allowed to access the enterprise network 107. Each specific user's access to specific resources and data 301 within the network 107 can be further restricted as appropriate.

In FIG. 3, a server 105 with Exchange ActiveSync 309 and Exchange Server 311 is illustrated as residing in the enterprise network 107. These components are illustrated as residing on a single server 105 for clarity of illustration, but in practice would frequently be distributed across multiple machines. Thus, in the embodiment illustrated in FIG. 3, Exchange Server 311 is used as a groupware platform and Exchange ActiveSync 309 is used to synchronize Exchange Server based data 301 with mobile computing devices 307. In other embodiments, different groupware platforms, types of data 301, synchronization technologies and/or access methods can be used, as discussed in more detail below.

The device connection management system 101 enables an administrator 305 to set rules 313 concerning which classes 317 of mobile computing devices 307 can automatically connect to the enterprise network through Exchange ActiveSync 309. For example, the administrator 305 could set a rule 313 specifying that each authorized user (e.g., each employee of a given company with an account on the company network 107) could have one smartphone, one tablet and one laptop computer with which s/he could connect into the network using Exchange ActiveSync 309. As described in detail below, the device connection management system 101 automatically applies the device classification level rules 313 to synchronization requests received from mobile computing devices 307.

In order to manage access at a device classification level, a class defining module 315 of the device connection management system 101 defines multiple device classes 317, such that each mobile device 307 attempting to connect to the enterprise network 107 can be classified appropriately. More specifically, the device classes 317 are defined at the level at which the rules 313 governing access and synchronization policies are to be made. The class defining module 315 can supply default classes 317 based on a typical configuration (e.g., smartphone, tablet and laptop). In some embodiments, the administrator 305 supplies non-default classes 317, and edits and/or deletes default ones, for example through a GUI or command line. The classes 317 can be at any level of granularity, depending upon the specific rule 313 based access/synchronization configuration policies desired. For example, at a very high level, all mobile devices could be divided into just two classes 317 (e.g., hand held and laptop). At a medium level, the three classes 317 smartphone, tablet and laptop could be used. Lower level classes 317 can be defined that further distinguish between different types of mobile computing devices 307 such as iPhone, Android phone, Windows phone and Blackberry as opposed to the higher level, general class of smartphone. Another example of making lower level distinctions would be defining separate classes 317 for different gradations of portable clamshell type computers, such as desktop replacement grade notebook, subnotebook, netbook, etc., instead of a single, higher level laptop class 317. The class defining module 315 can also define new classes 317 over time, both automatically (e.g., based on the rollout of new types of mobile platforms such as wearable computing devices) and in response to input from an administrator 305 (e.g., based on a desire to create new access/synchronization rules 313 at a different level of granularity).

A device definition assigning module 318 of the device connection management system 101 assigns definitions of specific mobile devices 307 to one of the defined classes 317 based on descriptions or other attributes of the devices 307. A definition of a given mobile device 307 is a collection of attributes such as name, model number, type, ID, OS name and OS version that in combination identify that specific mobile device 307. A definition of a given mobile device 309 is to be distinguished from an instance of that specific device 309. For example, a definition of a specific smartphone includes the attributes that can be used to determine that unknown devices are instances of the specific smartphone. An actual instance of the specific smartphone is an individual smartphone that meets the definition.

In some embodiments, the device definition assigning module 318 assigns definitions of multiple known mobile devices 307 to appropriate classes 317 prior to receiving access requests from individual instances of these known devices 307. Thus, a base of known mobile computing devices 307 can be established, which can be useful in classifying subsequently encountered unknown mobile devices 307 that make access requests. For example, the device definition assigning module 318 could assign definitions of various known, commonly used smartphones to the smartphone class 317. Examples of definitions of such known smartphones are specific versions of the iPhone running specific versions of iOS, specific Samsung (and/or HTC, Motorola, etc.) phones running specific versions of Android, specific Nokia phones running Windows 8, etc. The device definition assigning module 318 could also further assign definitions of other types of known mobile devices 307 appropriately, such as specific known tablets (e.g., known iPad versions, known Google/Asus Nexus tablets, specific Lenovo Android tablets, etc.). As noted above, the device definition assigning module 318 can make these assignments based on attributes of the specific device 307 such as the model, type, ID, name, OS, etc. The exact criteria that the device definition assigning module 318 uses to makes these assignments can vary between embodiments. As with the defining of the classes 317 themselves, the level of granularity to be used when defining, assigning, identifying and classifying specific mobile devices 307 are variable design parameters. In some embodiments, the administrator 305 can enter, edit and/or delete these assignments and/or classifications as desired.

A request receiving module 321 of the device connection management system 101 receives access requests from mobile computing devices 307. In the embodiment illustrated in FIG. 3, such requests are in the form of requests to connect to Exchange ActiveSync 309, although the requests can take other specific forms in other embodiments. When a request is received from a mobile computing device 307, a request reading module 323 of the device connection management system 101 reads the request in order to identify (and hence subsequently classify) the device 307. In the case of Exchange ActiveSync 309, an access request contains inventory information concerning the requesting device 307. Thus, in Exchange ActiveSync 309 based environments, the request reading module 323 reads the inventory to identify the mobile device 307.

A device classifying module 319 of the device connection management system 101 determines whether a definition of the specific requesting mobile device 307 has already been assigned to a class 317 (i.e., whether the mobile device 307 is known). If so, the device classifying module 319 classifies the requesting mobile device 307 accordingly. For example, if the ActiveSync inventory identifies the requesting mobile device 307 as being an instance of a specific model number of an HTC One running Android 4.1 which has already been assigned to the smartphone class 317, the device classifying module 319 can classify the requesting mobile device 307 as a smartphone without further investigation.

In one embodiment, where the requesting mobile device 307 is unknown (e.g., a definition of the specific device has not been previously assigned to a class 317), the device classifying module 319 compares information concerning the mobile device 307 gleaned from the request (e.g., the ActiveSync inventory) to corresponding information concerning known mobile devices 307, in order to find the most similar known mobile device 307. The device classifying module 319 then classifies the requesting mobile device 307 according to the class 317 of the best match. For example, suppose an access request is received from an iPhone 5 running iOS version 7.0. In this example scenario, the iPhone 5 running iOS 6.x is known to be a smartphone, but no definition exists for an iPhone 5 with iOS version 7.0. By comparing the information concerning the requesting mobile device 307 to known devices 307, the device classifying module 319 could determine that the requesting unknown mobile device 307 and the known iPhone 5 iOS 6.x device 307 are both iPhones, but that the requesting device has a later version of iOS. Adjudicating the known iPhone 5 iOS 6.x to be the best match for the unknown iPhone 5 iOS 7.0, the device classifying module 319 would thus assign the mobile device 307 to the class 317 smartphone, the class 317 to which the matching known mobile device 307 belongs. The device classifying module 319 would save the classification of the iPhone 5 iOS 7.0 as a smartphone, and thus would recognize subsequent requests received from iPhone 5s running iOS 7.0 as being from smartphones without further investigation. In other words, once the iPhone 5 iOS 7.0 has been identified and assigned to a class 317, it becomes a known mobile device 307.

It is to be understood that the classification scenario described above is an example only, and in different embodiments the criteria used to adjudicate known mobile devices 307 as being similar to an unknown mobile device 307 for classification purposes vary. The specific attributes concerning mobile devices 307 that are gleaned from requests (e.g., from ActiveSync inventories) can vary depending upon what information is contained in the request, and the level of device identification granularity desired in the embodiment. As noted above, examples of these attributes are information such as model, type, ID, name, OS, etc. In addition, which specific attributes to associate with a definition of a specific mobile device 307 to be classified is a variable design parameter. Which attributes to use in this capacity can be based on what information is available in access requests and the embodiment specific level of device identification granularity. In the example above, different iPhones definitions are described as containing a name ("iPhone"), model number (5), OS (iOS) and OS version number (6.x, 7.0). In other embodiments, specific mobile devices 307 can be identified with greater levels of precision, such as a more precise model number information (e.g., A1428 which identifies the iPhone 5 GSM model, A1429 which identifies the iPhone 5 GSM/CDMA model, and A1442 which identifies the iPhone 5 CDMA China model) and a more precise iOS version number (e.g., 6.0, 6.0.1, 6.0.2, 6.1, 6.1.1, etc.). In other embodiments, more general, higher level identifications are made (e.g., all mobile devices 307 with the name "iPhone" are defined as being the same mobile device 307 without regard to model number, OS version, etc.).

When an unknown mobile device 307 is encountered, the specific matching logic that is applied to find the most similar known device 307 on which to base the classification can also vary between embodiments. Typically, attributes of the unknown mobile device 307 gleaned from the request are compared to attributes of known devices 307, based on the embodiment specific attributes used to define, identify and classify mobile devices 307 (e.g., name, model number, type, ID, OS name, OS version, etc.). In finding the best match, the number of attributes of the unknown device 307 that are equal in value to each known device 307 is taken into account. For example, a known mobile device 307 that has the same name, model number and OS as the unknown device 307 typically would, all else being equal, be a better match than a known device sharing only the same OS. Additionally, weights can be assigned to different attributes (e.g., having the same name could be considered more indicative of a good match than having the same OS). The specific weights to apply to given attributes are variable design parameters, which can be set to reflect the embodiment specific levels of importance of the different attributes in the calculus of determining most similar known mobile devices 307 for the purpose of classifying unknown ones.

In some embodiments, the device classifying module 319 simply classifies unknown mobile devices 307 based on the information in the inventory, without comparing the unknown device 307 to known ones. For example, the device classifying module 319 could classify all unknown mobile devices 307 that have specific names or other characteristics according to predefined criteria (e.g., mobile devices 307 with "phone" in the name could be automatically classified as smartphones, etc.). In some embodiments, the device classifying module 319 only does this if the gleaned information concerning the mobile device 307 meets embodiment specific criteria with a desired threshold level of device identification confidence (e.g., devices with iPhone in the name are smartphones, devices for which the OS is Windows 7 are laptops, etc.). In such embodiments, where the identification cannot be made with the requisite level of confidence based on the ActiveSync inventory, the device classifying module 319 then performs the above-described comparing functionality to find a most similar known device 307. The specific criteria that rise to the threshold level of device identification confidence are variable design parameters. In other embodiments, the device classifying module 319 only attempts to identify an unknown mobile device 307 based on the inventory information if the comparison with known mobile devices 307 did not yield a sufficiently similar candidate on which to base on classification. In this case, the device classifying module 319 can attempt to make a classification of the unknown mobile device 307 based on the information available, or instead categorize it as being of the class "unknown."

Based on the classification of mobile devices 307 requesting to connect to the enterprise network 107 via Exchange ActiveSync 309, an access governing module 303 of the device connection management system 101 governs the access requests according to at least one device classification level rule 313 that specifies an access policy for devices of the given class 317. For example, in some embodiments the access governing module 303 allows users to self-register multiple mobile computing devices 307 without having to request and receive exceptions from an administrator 305, wherein the number and classes 317 of mobile devices 307 that can be self-registered are limited according to a specific device classification level rule 313. For example, suppose the administrator 305 has defined a rule 313 specifying that each user can access the enterprise network 107 through Exchange ActiveSync 309 using one smartphone, one tablet and one laptop, but access with any additional mobile devices 307 requires a granted exception. In this scenario, in response to each access request received from an unregistered mobile device 307, the access governing module 303 identifies the user and the class 317 of the mobile device 307. It is to be understood that the user is identified by the user name supplied in the login attempt (i.e., the attempt to login to the enterprise level system such as Exchange Server 311 via the synchronization platform such as Exchange ActiveSync 309). The access governing module 303 checks the registration information stored by Exchange ActiveSync 309 (and/or by the device connection management system 101 itself in some embodiments), and determines whether this user already has a different mobile device 307 of the same class registered. The access governing module 303 permits the self-registration if the user does not already have a registered mobile device 307 of the same class 317 (e.g., the user is attempting access with a smartphone, and does not already have a different smartphone registered). On the other hand, the access governing module 303 blocks the self-registration if a different mobile device 307 of the same class 317 is already registered for the user. Where self-registration of a device 307 is not permitted, the user can request an exception from an administrator 305. Once the specific mobile device 307 is registered for the user, the user is able to utilize the mobile device 307 to automatically connect to Exchange ActiveSync 309 and synchronize the Exchange Server based (or other type of centralized enterprise level) data 301.

It is to be understood that the scenario described above is only an example of a possible device classification level rule 313 to govern automatic access via Exchange ActiveSync 309. Other possible (non-exhaustive) examples are allowing each user to self-register any two mobile devices 307 provided that they are of different classes 317, allowing one iPhone, one Android phone, one tablet of any kind and one Windows laptop, allowing one laptop and one additional mobile device 307 that is not a laptop, etc. Different rules 313 can also be created for different classes of user, depending upon their needs (e.g., managers can self register more devices than non-managers, developers in the Linux division can self register multiple Linux devices, etc.). By automatically governing access at a device classification level as opposed to simply allowing one mobile device 307 per user, the number of exception requests the administrator 305 needs to manage is greatly reduced, and at the same time the administrator 305 is provided with the flexibility to create and automatically apply customized access policies at any level of device classification based granularity.

FIG. 3 illustrates an embodiment in which the device connection management system 101 applies device classification level rules 313 specifying the number of mobile devices 307 of particular classes 317 authorized for connecting to an enterprise network 107 via Exchange ActiveSync 309 and synchronizing Exchange Server based data 301. It is to be understood that this embodiment is only one specific use case of the device connection management system 101. As noted above, in some embodiments the device connection management system 101 performs its device classification level access management within the context of groupware platforms other than Exchange Server 311 and/or synchronization protocols other than Exchange ActiveSync 309. Furthermore, in some embodiments this functionality is applied in data access scenarios other than synchronization of data 301 at an enterprise network 107 level with mobile devices 307.

In different embodiments, the device connection management system 101 can classify computing devices 210 and enforce device classification level rules 313 to govern access to centralized data 301 from multiple classes 317 of computing devices 210 (mobile or otherwise, e.g., desktop computers and workstations of specific makes, models, operating systems, processors, etc.) under any circumstances. In other words, in any scenario under which it is desirable to limit access to enterprise level data 301 for security reasons according to device classification, rules 313 can be defined specifying the access policy, and the device connection management system 101 can classify computing devices 210 attempting access and apply the rules 313. Device classification level rules 313 can specify to limit the number of computing devices 210 of given classifications authorized for access of the centralized data 301 based on the specific task being performed, the type of data 301, the location of the user, etc. In some scenarios, devices of a specific class 317 are blocked from access outright (i.e., the number is limited to zero). Which specific device classification level rules 313 to define and apply under what circumstances varies depending upon the access policy the enterprise level administrator 305 wishes to enforce. In some embodiments, the device connection management system 101 supplies certain preconfigured default device classification level rules 313. Typically, an enterprise level administrator 305 can define, add, edit and delete rules 313 as desired, to define a device classification level access policy to be automatically applied by the device connection management system 101.

Figure 4:
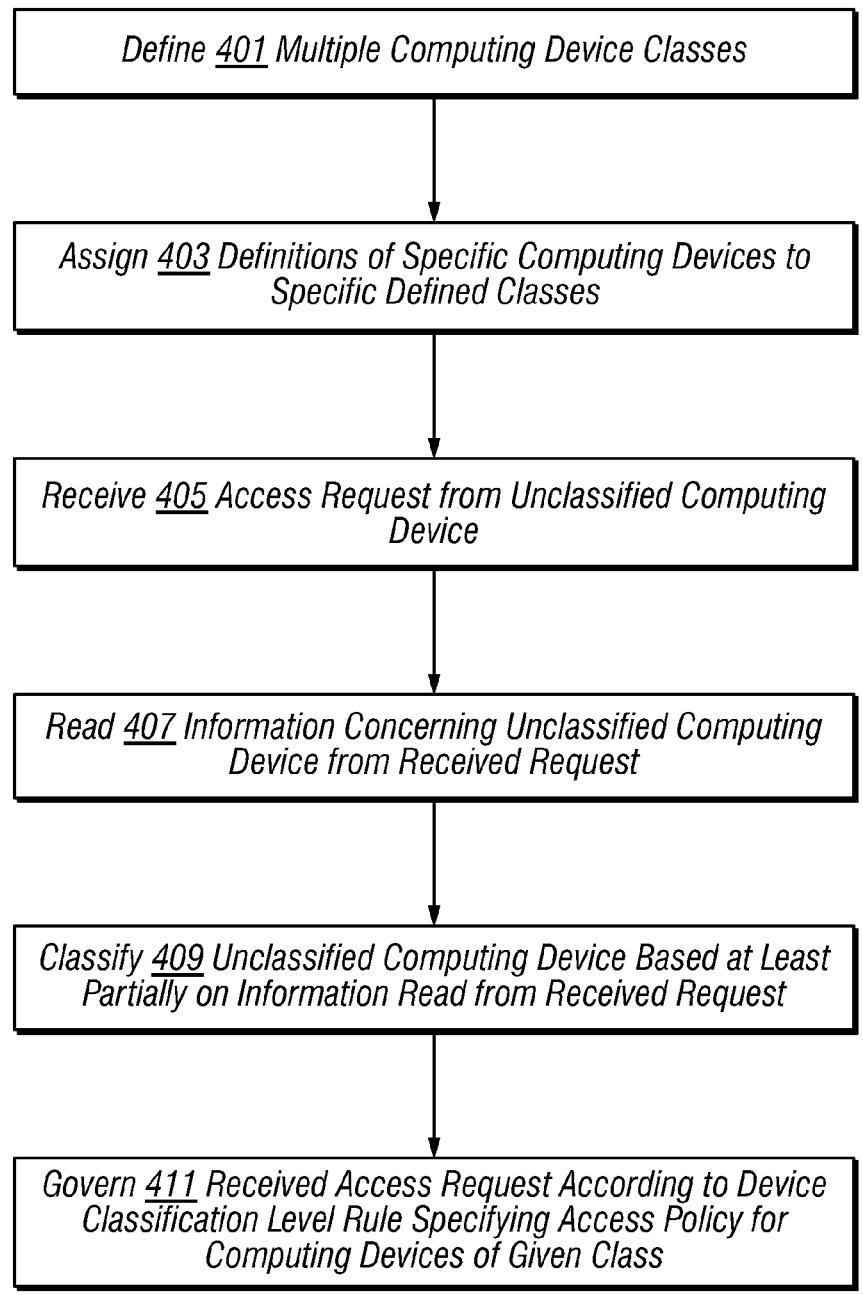
FIG. 4 is a flowchart of the operation of a device connection management system, according to some embodiments.

FIG. 4 illustrates steps of the operation of a device connection management system 101, according to some embodiments. The class defining module 315 defines 401 multiple classes 317 of computing device 210. The device definition assigning module 318 assigns 403 definitions of specific computing devices 210 to specific ones of the defined classes 317. The request receiving module 321 receives 405 an access request from an unclassified computing device 210. The request reading module 323 reads 407 information concerning the unclassified computing device 210 from the received request. The device classifying module 319 classifies 409 the unclassified computing device 210 based at least partially on information concerning the computing device 210 read from the received request. Based on the classification, the access governing module 303 governs 411 the received access request according to a device classification level rule 313 that specifies an access policy for computing devices 210 of the given class 317.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for managing attempts made by computing devices to access centralized enterprise level data according to at least one device classification level rule, the method comprising the steps of:

defining a plurality of classes of computing devices, by a computer;

assigning definitions of each specific one of a plurality of computing devices to a specific one of the plurality of defined classes, based on attributes concerning the specific computing device, by the computer;

receiving a request from an unclassified computing device to access centralized enterprise level data, by the computer, wherein the received request contains information concerning the unclassified computing device;

reading information concerning the unclassified computing device from the received request, by the computer;

classifying the unclassified computing device into a specific one of the plurality of defined classes, by the computer, based at least partially on information concerning the computing device read from the received request;

responsive to the classification of the computing device into the specific defined class, governing the received request to access centralized enterprise level data, by the computer, according to at least one device classification level rule, wherein the at least one device classification level rule specifies an access policy for computing devices of the specific defined class; and responsive to a definition of the unclassified computing device not having been assigned to a specific class, comparing information concerning the computing device read from the received request to corresponding information concerning multiple computing devices for which definitions have been assigned to defined classes, comprising:

comparing at least some attributes from a plurality of attributes;

assigning different weights to at least some of the plurality of attributes, wherein a weight assigned to an attribute reflects a level of importance of the attribute in determining most similar known mobile devices for the purpose of classifying unknown ones; and saving the classification of the computing device to classify subsequent instances of unknown computing devices having a same definition.

2. The method of claim 1 wherein:
the computing devices further comprise mobile computing devices.

3. The method of claim 1 wherein:
the request from the unclassified computing device to access centralized enterprise level data further comprises a request from an unclassified mobile computing device to synchronize data on an enterprise network with data on the mobile computing device.

4. The method of claim 3 wherein:
the request from the unclassified mobile computing device to synchronize data on the enterprise network with data on the mobile computing device further comprises a request to access the enterprise network and synchronize data via Exchange ActiveSync.

5. The method of claim 1 wherein defining the plurality of classes of computing devices further comprises:
supplying a plurality of default class definitions.

6. The method of claim 1 wherein defining the plurality of classes of computing devices further comprises:
receiving at least some class definitions from an enterprise level administrator.

7. The method of claim 1 wherein assigning definitions of each specific one of a plurality of computing devices to a specific one of the plurality of defined classes based on attributes concerning the specific computing device further comprises:
assigning definitions of computing devices to defined classes based on at least some attributes concerning specific computing devices from a group of attributes consisting of: a name, a model number, a type, an ID, an operating system name and an operating system version.

8. The method of claim 1 wherein reading information concerning the unclassified computing device from the received request further comprises:
reading an inventory of the unclassified computing device contained in the received request.

9. The method of claim 1 wherein reading information concerning the unclassified computing device from the received request further comprises:
reading at least some attributes concerning the unclassified computing device from the received request from a group of attributes consisting of: a name, a model number, a type, an ID, an operating system name and an operating system version.

10. The method of claim 1 wherein classifying the unclassified computing device into a specific one of the plurality of defined classes further comprises:
adjudicating a specific one of the multiple computing devices as being most similar to the unclassified computing device based on the comparing of information; and
classifying the unclassified computing device into a specific class to which a definition of the computing device adjudicated as being most similar has been assigned.

11. The method of claim 1 further comprising:
allowing individual users to each automatically access enterprise level data using only up to a specific number of computing devices of each of multiple specific classes, based on a classification level rule limiting the number of computing devices of each of multiple specific classes with which individual users are permitted to access enterprise level data without requiring any additional action by an enterprise level administrator.

12. The method of claim 1 further comprising:
allowing individual users to each self-register only up to a specific number of computing devices of each of multiple specific classes, based on a classification level rule limiting the number of computing devices of each of multiple specific classes that individual users are permitted to self-register; and
allowing individual users to automatically access enterprise level data with computing devices registered to them, without requiring any additional action by an enterprise level administrator.

13. The method of claim 1 further comprising:
governing received requests made by different users to access centralized enterprise level data according to different device classification level rules, wherein the different device classification level rules specify different access policies for users of different classes.

14. The method of claim 1 further comprising:
receiving at least one device classification level rule specifying an access policy, from an enterprise level administrator.

15. At least one non-transitory computer readable-storage medium for managing attempts made by computing devices to access centralized enterprise level data according to at least one device classification level rule, the at least one non-transitory computer readable-storage medium storing computer executable instructions that, when loaded into computer memory and executed by at least one processor of a computing device, cause the computing device to perform the following steps:
defining a plurality of classes of computing devices;
assigning definitions of each specific one of a plurality of computing devices to a specific one of the plurality of defined classes, based on attributes concerning the specific computing device;
receiving a request from an unclassified computing device to access centralized enterprise level data, wherein the received request contains information concerning the unclassified computing device;
reading information concerning the unclassified computing device from the received request;
classifying the unclassified computing device into a specific one of the plurality of defined classes, based at least partially on information concerning the computing device read from the received request;
responsive to the classification of the computing device into the specific defined class, governing the received request to access centralized enterprise level data, according to at least one device classification level rule, wherein the at least one device classification level rule specifies an access policy for computing devices of the specific defined class; and
responsive to a definition of the unclassified computing device not having been assigned to a specific class, comparing information concerning the computing device read from the received request to corresponding information concerning multiple computing devices for which definitions have been assigned to defined classes, comprising:
comparing at least some attributes from a plurality of attributes;
assigning different weights to at least some of the plurality of attributes, wherein a weight assigned to an attribute reflects a level of importance of the attribute in determining most similar known mobile devices for the purpose of classifying unknown ones; and
saving the classification of the computing device to classify subsequent instances of unknown computing devices having a same definition.

16. The at least one non-transitory computer readable-storage medium method of claim 15 wherein:
the computing devices further comprise mobile computing devices.

17. The at least one non-transitory computer readable-storage medium method of claim 15 wherein:
the request from the unclassified computing device to access centralized enterprise level data further comprises a request from an unclassified mobile computing device to synchronize data on an enterprise network with data on the mobile computing device.

18. A computer system for managing attempts made by computing devices to access centralized enterprise level data according to at least one device classification level rule, the computer system comprising:
at least one processor;
system memory;
a class defining module residing in the system memory, the a class defining module being programmed to define a plurality of classes of computing devices;
a device definition assigning module residing in the system memory, the device definition assigning module being programmed to assign definitions of each specific one of a plurality of computing devices to a specific one of the plurality of defined classes, based on attributes concerning the specific computing device;
a request receiving module residing in the system memory, the request receiving module being programmed to receive a request from an unclassified computing device to access centralized enterprise level data, wherein the received request contains information concerning the unclassified computing device;
a request reading module residing in the system memory, the request reading module being programmed to read information concerning the unclassified computing device from the received request;
a device classifying module residing in the system memory, the device classifying module being programmed to classify the unclassified computing device into a specific one of the plurality of defined classes, based at least partially on information concerning the computing device read from the received request;
an access governing module residing in the system memory, the access governing module being programmed to govern the received request to access centralized enterprise level data according to at least one device classification level rule, responsive to the classification of the computing device into the specific defined class, wherein the at least one device classification level rule specifies an access policy for computing devices of the specific defined class; and
an information comparing module programmed for, responsive to a definition of the unclassified computing device not having been assigned to a specific class, comparing information concerning the computing device read from the received request to corresponding information concerning multiple computing devices for which definitions have been assigned to defined classes, comprising:
comparing at least some attributes from a plurality of attributes;
assigning different weights to at least some of the plurality of attributes, wherein a weight assigned to an attribute reflects a level of importance of the attribute in determining most similar known mobile devices for the purpose of classifying unknown ones; and
saving the classification of the computing device to classify subsequent instances of unknown computing devices having a same definition.

\* \* \* \* \*